United States Patent
Ziegler

(10) Patent No.: US 7,475,088 B2
(45) Date of Patent: Jan. 6, 2009

(54) SYSTEMS AND METHODS OF PROVIDING DATA FROM A DATA SOURCE TO A DATA SINK

(75) Inventor: Carsten M. Ziegler, Walldorf (DE)

(73) Assignee: SAP AG, Walldorf (DE)

( * ) Notice: Subject to any disclaimer, the term of this patent is extended or adjusted under 35 U.S.C. 154(b) by 538 days.

(21) Appl. No.: 10/902,918

(22) Filed: Aug. 2, 2004

(65) Prior Publication Data

US 2005/0065968 A1 Mar. 24, 2005

(30) Foreign Application Priority Data

Aug. 4, 2003 (EP) .................................. 03017787

(51) Int. Cl.
G06F 17/30 (2006.01)
(52) U.S. Cl. ....................... 707/102; 707/100
(58) Field of Classification Search ............... 707/1–10, 707/100–104.1, 200–206, 505; 345/505
See application file for complete search history.

(56) References Cited

U.S. PATENT DOCUMENTS

| | | | |
|---|---|---|---|
| 5,781,911 A | 7/1998 | Young et al. | |
| 6,161,103 A * | 12/2000 | Rauer et al. | 707/4 |
| 6,470,333 B1 | 10/2002 | Baclawski | |
| 6,493,720 B1 | 12/2002 | Chu et al. | |
| 2003/0189571 A1* | 10/2003 | MacInnis et al. | 345/505 |
| 2007/0030276 A1* | 2/2007 | MacInnis et al. | 345/505 |

OTHER PUBLICATIONS

James Kanze, "Filtering Streambufs Variations on a Themes by Schwarz", no date, http://kanze.james.neuf.fr/articles/flrsbfl.html, pp. 1-8.*

* cited by examiner

Primary Examiner—Diane Mizrahi
(74) Attorney, Agent, or Firm—Finnegan, Henderson, Farabow, Garrett & Dunner, LLP

(57) ABSTRACT

Systems and methods are disclosed for providing data from a data source to a data sink that uses remote function calls and extractors include first meta data provided from the data source to the data sink. On the basis of the meta data, a data request is formulated by the data sink and a corresponding remote function call is made. In response, an extractor structure is filled with data and reduced to a sub-structure that is returned to the data sink.

22 Claims, 4 Drawing Sheets

SYSTEMS AND METHODS OF PROVIDING DATA FROM A DATA SOURCE TO A DATA SINK

FIELD

The present invention relates to the field of data processing and, more particularly without limitation, to systems and methods for facilitating data extraction.

BACKGROUND

Various data extractors are known in the art. A data extractor is a program used to fill a given extractor structure with data from a database. The extracted data is provided from the source system to a data warehouse for the purposes of, for example, analysis and management information.

U.S. Pat. No. 6,470,333 shows a knowledge extraction system which includes an information retrieval apparatus for processing a query for retrieval of information from a database. The information retrieval apparatus has a mechanism for locating a number of features in an index database and an evaluating mechanism for identifying a number of sub-queries of a number of levels contained in the query and recursively evaluating the sub-queries using each of the located features. Further, it has a mechanism for collecting and storing a number of results of the recursive evaluation of the query and sub-queries pursuant to computing an overall result of the query. This system is aimed to eliminate the need of conventional retrieval systems for providing a new, separate, centralized replica within the data warehouse of the data stored in the diverse external databases.

U.S. Pat. No. 5,781,911 shows a method of automatic generation of data warehouses. An extractor is used to extract data from the data sources and to load them into data marts according to a schedule defined by a system administrator.

U.S. Pat. No. 6,493,720 shows a method for synchronization of meta data in an information catalog. At specified intervals, a tool that operates on an object is monitored to identify changes to meta data of that object. When changes to the meta data are identified, an information catalog containing corresponding meta data for the objects is updated.

Referring to FIG. 1, a block diagram is provided that illustrates the usage of extractors in the context of a conventional online transactional processing (OLTP) system. OLTP system 100 has data source 102 which can be provided by an online relational database. OLTP system has a number of extractors 104, 106, 108, etc., for various data extraction tasks. Each one of the extractors 104, 106, 108, has an extractor structure which is filled with data from data source 102 when the corresponding extractor is invoked.

The extractors 104, 106, 108, are used to provide data to data warehouse 110. In operation, data warehouse 110 invokes one of the extractors 104, 106, 108 by sending a corresponding request to OLTP system 100. Further, data warehouse 110 generates an empty extractor structure 112 that is identical to the extractor structure of the one of the extractors 104, 106, 108, which is invoked by the request. Extractor structure 112 serves to accommodate the data, which will be delivered from OLTP system 100 in response to the request.

The selected one of the extractors, for example, extractor 104, queries data source 102 in order to fill its extractor structure with data. This data is sent from the OLTP system 100 to data warehouse 110 where the data is stored in extractor structure 112.

SUMMARY

The present invention relates to systems and methods for providing data from a data source to a data sink. In order to initiate the transfer of data from the data source to the data sink, the data sink sends a request for meta data to the data source. In response, the data source provides a list of entities of its data to the data sink. Next, the data sink sends another request for meta data to the data source, which specifies one or more of the entities. In response to the second request for meta data, the data source provides descriptors for the extractor structures of the entities indicated in the second meta data request. This way the data sink obtains knowledge concerning the structure of the data of the data source in a generic way. Based on this information on the data, which is available from the data source, the data sink can request sub-sets of the available data from the data source. This may be done by sending a data request from the data sink to the data source. The data request may specify at least one entity and have a descriptor in order to specify a sub-structure of the extractor structure of the specified entity.

In response to the data request, the complete extractor structure of the entity may be filled with data by the data source. Next, the extractor structure may be reduced to the sub-structure as specified in the data request. Further, the data contained in the sub-structure may be returned to the data sink.

Systems and methods consistent with the invention may provide numerous advantages in comparison to known data extraction techniques. One of the advantages is that the interface between the data sink and the data source is generic, such that not only specific data warehouses can act as a data sink, but also various different kinds of applications which require data from a data source for any purpose.

Another advantage is that the data sink does not need to provide a complete extractor structure for all the data available from the data source. Rather, the data sink may be enabled to specify a sub-set of the data of interest. This reduces the amount of memory required by the data sink and substantially reduces the data transmission time from the data source to the data sink.

Another advantage is that known extractors can be used within the principles of the present invention. This has the further advantage that the business logic, which is implemented in the extractors, is useable by the data sink.

In accordance with one embodiment, functions having remote function call capability are provided on the side of the data source for dealing with the meta data requests and the data requests received from the data sink. For example, there may be one function that is called by the meta data requests and which provides the list of entities and the descriptors of the corresponding extractor structures.

Further, there may be a second function that deals with data requests and triggers a corresponding extractor in order to fill the extractor structure with data. These functions may be implemented as plug-in modules.

In accordance with a further embodiment, the extractor structure may be tabular. The tabular extractor structure may be described by means of its field names. In addition, other meta data may be provided to describe the extractor structure such as the kind of field, i.e., key or attributive data, and the so-called cardinality of a field. In this case, a sub-structure of the extractor structure may be specified by indicating a sub-set of the field names that are of interest to the data sink.

In accordance with a further embodiment, the sub-structure of the extractor structure, which has been filled with the data, may be transformed to a sequential list having a predefined format, such as one column for the field name and one column for the field value. This facilitates the inter-operation between the data source and data sink.

In accordance with still a further embodiment, the meta data stored in the data sink may be updated from time to time in order to reflect corresponding changes, which have been performed on the side of the data source. In order to ensure that the meta data is available on the side of the data sink is up to date, time stamping may be used. For example, an element of an extractor structure, such as a field, may be time stamped when its format is modified. When meta data is requested by the data sink the time stamps of the elements of the extractor structure are included in the descriptor being returned to the data sink. Further, the time-stamps of the elements of a sub-structure returned from the data source to the data sink may also be included in the data transferred from the data source to the data sink, such that the data sink can make a determination if the copy of the meta data it currently has is up to date or not. If the data sink determines that the meta data it has is not longer up to date, it may issue corresponding requests to the data sink for updating of its meta data.

Alternatively, there may be only one time stamp per entity. The data sink may obtain the time stamp information of an entity by means of a corresponding remote function call. The time stamp may be stored by the data sink. From time to time, the data sink may check whether it still has up-to data meta data, such as by remotely calling the function again. The data sink compares the time stamp information returned by the remote function call to the time stamp information that has been stored previously. If the time stamps are identical, the data sink still has up to date meta data. If the time stamps are not identical, the data sink will make another remote function call to update its meta data.

In accordance with a further embodiment, a user interface may be provided on the side of the data sink. The meta data received by the data sink from the data source may be visualized on the user interface. For example, a list of the field names contained within the extractor structures may be displayed on the user interface or another kind of visualization to show the extractor structures. The user of the data sink can specify a sub-structure by means of the user interface, for example, by selecting a sub-set of the field names. Further, the user can also specify more complex queries by means of Boolean operators together with the field names.

In accordance with a further embodiment, the data source may be an online relational database of an OLTP system. Preferably, however, the data sink is an off-line system used for the analysis of the online process such as for the purpose of management information.

The accompanying drawings, which are incorporated in and constitute a part of this specification, illustrate several embodiments and together with the description, serve to explain the principles of the present invention.

BRIEF DESCRIPTION OF THE DRAWINGS

In the following, embodiments will be described in greater detail by making reference to the drawings in which.

DESCRIPTION OF THE EMBODIMENTS

Figure 1:
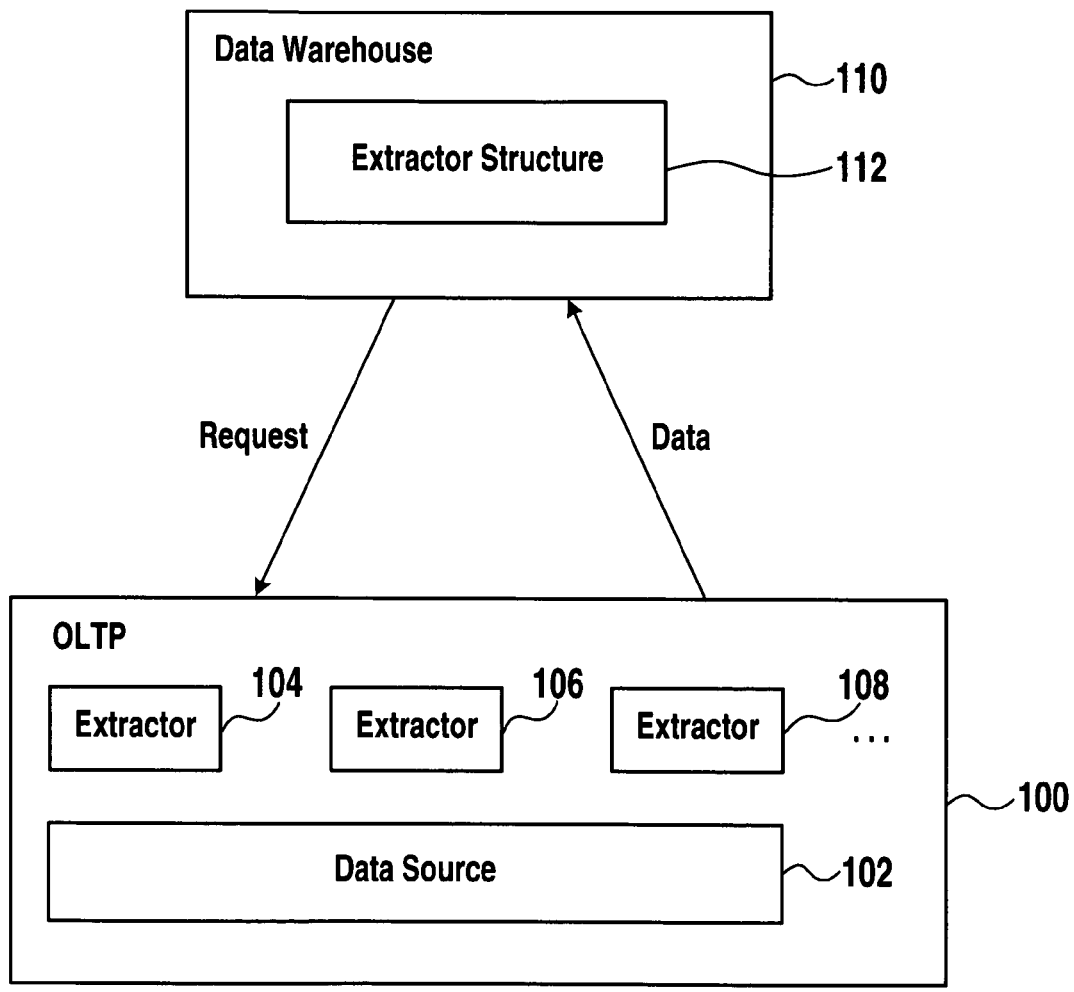
FIG. 1 shows a block diagram of a conventional OLTP and data warehouse system.
Figure 2:
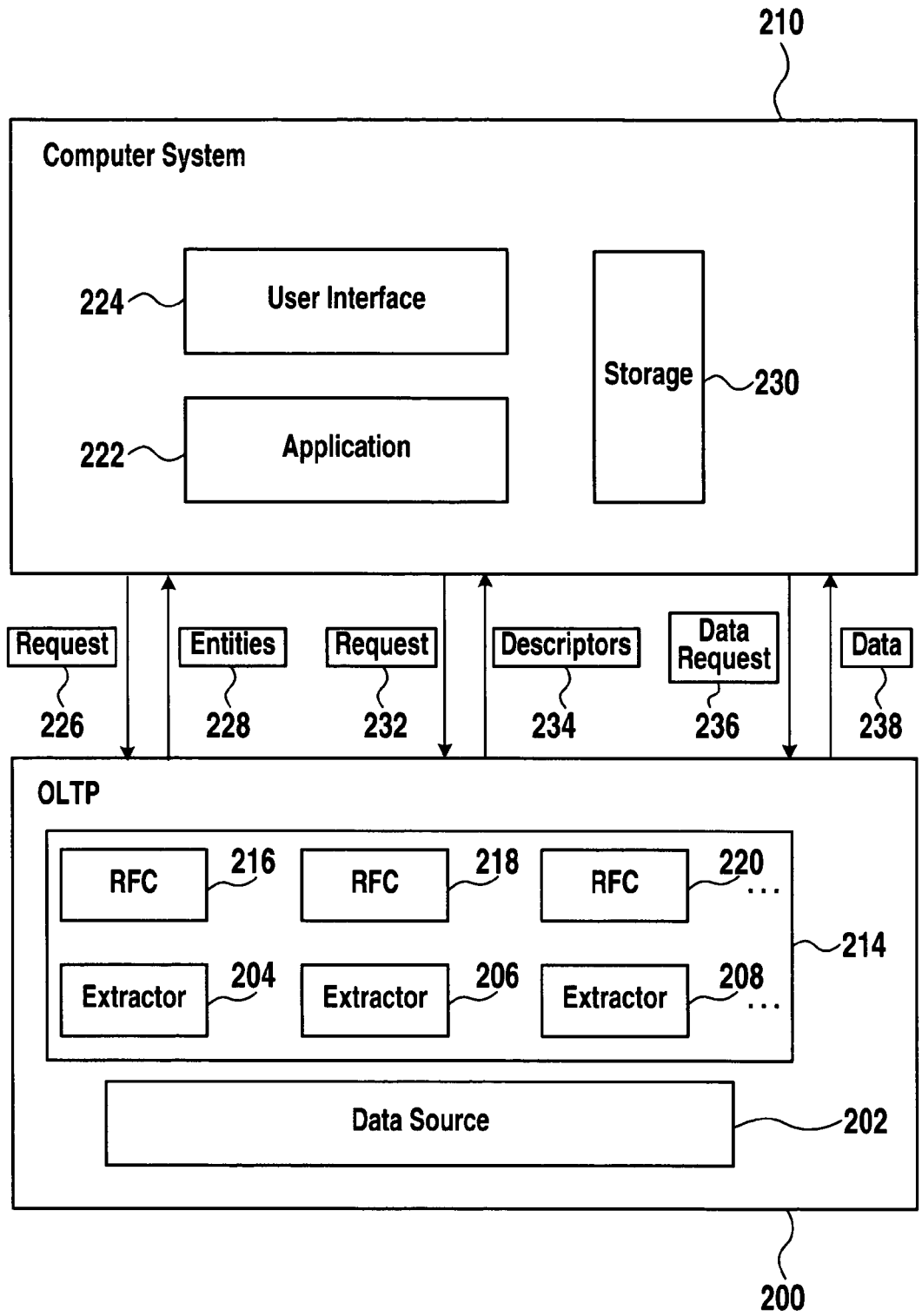
FIG. 2 shows a block diagram of an exemplary computer system, consistent with the principles of the present invention.

Consistent with an embodiment of the invention, FIG. 2 shows an exemplary OLTP system 200 that includes a data source 202. OLTP system 200 further includes one or more extractors 204, 206, 208, etc., for extracting data from data source 202. Each one of the extractors 204, 206, 208 may have a predefined tabular extractor structure, which is filled with data from data source 202 each time the corresponding extractor is invoked.

As shown in FIG. 2, the extractors 204, 206, 208 may be implemented in a plug-in layer 214. Functions 216, 218, 220, etc., may also be implemented in plug-in layer 214. Functions 216, 218, 220 may also have remote function call capability.

By way of example, function 216 is, in one embodiment, function "get meta data ( )". This function returns meta data being descriptive of extractor structures. By way of further example, function 218 is, in one embodiment, the function "get data ( )". This function provides a sub-set of the data contained in an extractor structure in accordance with a user's specification of the sub-set. As a further example, function 220 may be a help function. In addition, there may be other specialized functions for specific purposes.

The exemplary embodiment of FIG. 2 also includes a computer 210. Computer 210 may have at least one application program 222 and a program module, which provides a user interface 224. In operation, computer 210 may act as a data sink and OLTP system 200 as a data source. The transfer of data from the data source 202 to the data sink, i.e., computer 210, and, more specifically, application program 202, may be initiated as described below.

Application program 222 sends request 226 to OLTP system 200. Request 226 may be a remote function call of function 216. In response to request 226, function 216 returns a list 228 of the available data entities in the extractor structures of the extractors 204, 206, 208. List 228 may be stored in storage 230 of computer 210.

Next, application 222 sends request 232 to OLTP system 200. Request 232 may be a remote function call of function 216. Request 232 may have a list of operands specifying, for example, which entities of list 228 are of interest for application 222.

In response, function 216 returns descriptors 234 descriptive of the corresponding extractor structures. The descriptors 234 may be stored in storage 230 of computer 210.

The selection of the entities of list 228 which are of interest may be done by means of user interface 224. Further, the meta data, i.e., list 228 and descriptors 234 which are stored in storage 230, may enable the formulation of a specific data request by means of user interface 224.

In order to initiate the extraction of data from data source 202, a corresponding data request 236 is generated by computer 210 and sent to OLTP system 200. Data request 236 may be a remote function call of function 218. Data request 236 may have descriptors specifying sub-structures of extractor structures in order to restrict the amount of data that is requested to the data which is of interest to application program 222.

In response to data request 236, function 218 may invoke the corresponding extractors of extractors 204, 206, 208, in order to fill the corresponding extractor structures with data. The resulting extractor structures with the data are reduced to sub-structures as specified by the descriptors of data request 236. Only data 238 of these sub-structures is returned from OLTP system 200 to computer 210 for processing by application program 222.

Figure 3:
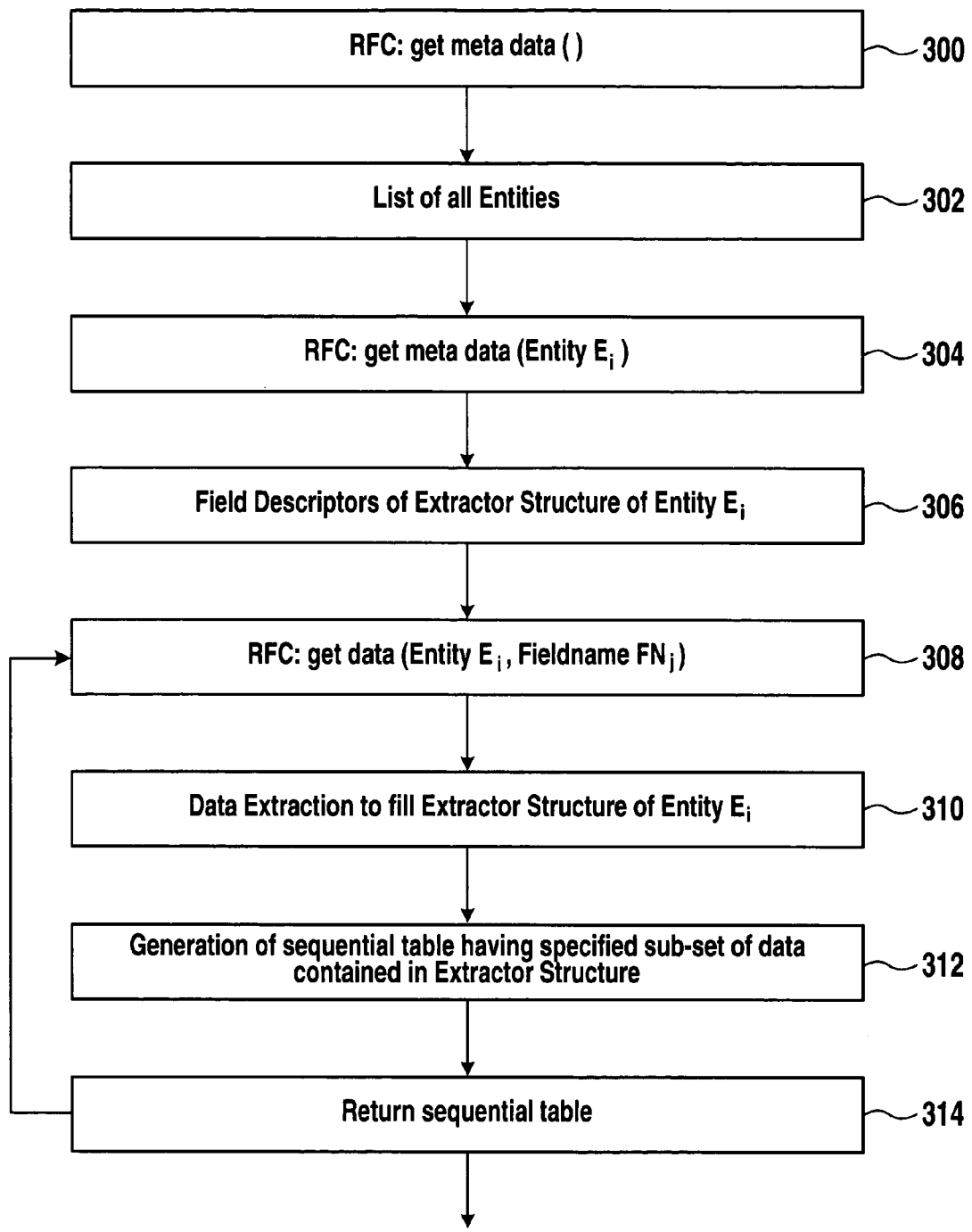
FIG. 3 is illustrative of one embodiment of a method, consistent with the present invention.

FIG. 3 shows a flow chart of an exemplary method, consistent with an embodiment of the invention. In stage 300, the function "get meta data ( )" is remotely called by the data sink. The function get meta data ( ) returns a list of all entities of the available extractor structures in stage 302. From this list of entities, at least one entity $E_i$ is selected by the application program (cf. application program 222 of FIG. 2) or by a user through the user interface (cf. user interface 224 of FIG. 2).

In stage 304, the function "get meta data ( )" may be remotely called again from the data sink. In the corresponding request, the selected entity $E_i$ may be specified. In response, the function returns field descriptors of the extractor structure of entity $E_i$.

On the basis of the meta data returned to the data sink in stages 302 and 306 the data of interest to the data sink may be specified. A corresponding data request is sent from the data sink to the data source in stage 308.

The data request may be a remote function call of the function "get data ( )" and indicate entity $E_i$ and one or more field names $FN_j$ of the extractor structure of entity $E_i$. The list of field names $FN_j$ of the request specifies a sub-structure of the original extractor structure. This will be explained in more detail below with reference to FIG. 4.

In stage 310, the extractor structure of entity $E_i$ is filled with data from the data source. This extractor structure is reduced to the sub-structure, as specified in the data request. The sub-structure has only the specified sub-set of data that is of interest to the data sink, and is transformed into a generic format, such as a sequential table having one column for the field names and one column for the field values. In stage 314, the sequential table is returned to the data sink.

After the table has been returned in stage 314, another data request may be made in stage 308, whereby it is assumed that the meta data is unchanged. Alternatively, the process may terminate.

Figure 4:
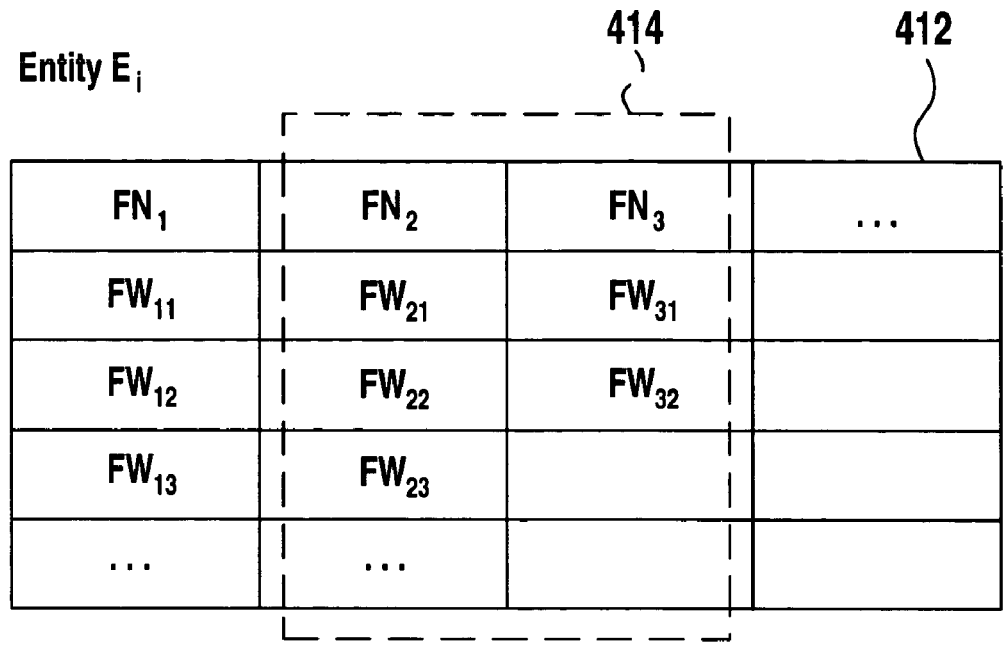
FIG. 4 is illustrative of a transformation of a sub-structure to a sequential list, consistent with the principles of the present invention.
Figure 4:
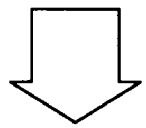

By way of example, FIG. 4 illustrates the reduction of an extractor structure of entity $E_i$ to the sub-structure specified in a data request. Extractor structure 412 of entity $E_i$ may be filled with data from the data source by means of one of the extractors, which is assigned to extractor structure 412. In the example considered here, extractor structure 412 is tabular and has field names $FN_1$, $FN_2$, $FN_3$, etc. The field with field name $FN_1$ has field values $FW_{11}$, $FW_{12}$, $FW_{13}$, etc. In general, a field with field name $FN_j$ has field values $FW_{jk}$.

In the following, it is assumed by way of example that field names $F_2$ and $F_3$ are indicated in the data request in order to specify sub-structure 414 of extractor structure 412. After extractor structure 412 has been filled with data from the data source by means of the corresponding extractor, which is assigned to extractor structures 412, the data contained in the sub-structure 414 may be transformed into sequential table 416.

Table 416 may have a generic format that is independent from the format of sub-structure 414. As shown in the example of FIG. 4, table 416 has one column for all field names FN and one column for all field values $FW_{jk}$. In the column FN, all field names $FN_j$ contained in sub-structure 414 are listed whereas in column FW the corresponding field values $FW_{jk}$ are listed.

The data requested in the data request may be returned to the data sink in the form of table 416. In addition, the data contained in table 416 may be transformed to Unicode, which provides a unique number for every character independent from platform, program or language.

Extractor structure 412 may be modified from time to time. For example, the byte length of the field values of a specific field may change or the cardinalities of the field values may change. In order to provide an updating mechanism for the meta data which is stored on the side of the data sink (cf. storage 230 of computer system 210 in FIG. 2) time stamping may be used.

In this case, the entity $E_i$ may have an assigned time stamp $T_j$ indicating the time when the format of one of the fields of extractor structure 412 was changed. This time stamping information may be provided to the data sink as part of the meta data and is stored there. This time stamp may be used by the data sink to check whether the meta data it has stored is still up to date.

Other embodiments will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of providing data from a data source to a data sink, the method comprising the steps of:
   a) receiving a first request from the data sink, wherein the first request does not specify a specific entity of the data source requested by the data sink;
   b) in response to the first request, sending a list of entities of the data source to the data sink;
   c) receiving a second request from the data sink, the second request being indicative of at least one of the entities;
   d) in response to the second request, sending a first descriptor descriptive of an extractor structure of the at least one entity to the data source;
   e) receiving a data request from the data sink, the data request indicative of the at least one entity and comprising a second descriptor descriptive of a sub-structure of the extractor structure of the at least one entity;
   f) filling the extractor structure with data from the data source;
   g) reducing the extractor structure to the sub-structure;
   h) sending the data of the sub-structure to the data sink; and
   i) presenting the data received by the data sink.

2. The method of claim 1, wherein the first request comprises a first remote function call for calling a first function providing the list of entities of the data source.

3. The method of claim 1, wherein the second request comprises a second remote function call for calling a second function providing the first descriptor.

4. The method of claim 1, the first descriptor comprising at least the field names of the at least one entity.

5. The method of claim 4, the second descriptor comprising a sub-set of the field names.

6. The method of claim 1, the data request comprising a third remote function call for calling a third function which serves to invoke an extractor for filling the extractor structure with data.

7. The method of claim 1, further comprising providing the sub-structure in the form of a sequential list.

8. The method of claim 1, wherein the stages e) to h) are performed repetitively.

9. The method of claim 1, wherein the stages a) to d) are repeated when the extractor structure of the at least one entity has been modified.

10. The method of claim 1, further comprising the stages of: modifying an element of the extractor structure; and time stamping the element.

11. A computer program for providing data from a data source to a data sink, when executed by a processor the computer program cause the processor to execute a method, the method comprising:
  a) receiving a first request from the data sink, wherein the first request does not specify a specific entity of the data source requested by the data sink;
  b) in response to the first request, sending a list of entities of the data source to the data sink;
  c) receiving a second request from the data sink, the second request indicative of at least one of the entities;
  d) in response to the second request, sending a first descriptor descriptive of an extractor structure of the at least one entity to the data source;
  e) receiving a data request from the data sink, the data request indicative of the at least one entity and comprising a second descriptor being descriptive of a sub-structure of the extractor structure of the at least one entity;
  f) filling the extractor structure with data from the data source;
  g) reducing the extractor structure to the sub-structure;
  h) sending the data of the sub-structure to the data sink; and
  i) presenting the data received by the data sink.

12. The computer program of claim 11, the computer instructions causing the processor to execute first, second and third functions, each one of the functions having a remote function call capability, the first function adapted to provide the list of entities, the second function adapted to provide the first descriptor, and the third function adapted to provide the sub-structure.

13. A computer system including a processor and instructions which when executed by the processor cause the processor to execute a method for providing data from a data source to a data sink, the system further comprising:
  a data source;
  a first data source function receiving a first request from a data sink, wherein the first request does not specify a specific entity of the data source requested by the data sink;
  the first data source function sending a list of entities of the data source to the data sink in response to the first request,
  receiving a second request from the data sink, the second request indicative of at least one of the entities, and
  sending a first descriptor descriptive of an extractor structure of the at least one entity to the data sink in response to the second request; and
  a second data source function receiving a data request from the data sink, the data request indicative of the at least one entity and comprising a second descriptor descriptive of a sub-structure of the extractor structure of the at least one entity,
  filling the extractor structure with data from the data sink,
  reducing the extractor structure to the sub-structure, and
  sending the sub-structure to the data sink.

14. The computer system of claim 13, the data source comprising a relational database.

15. The computer system of claim 13, the data source comprising an online transactional processing (OLTP) system.

16. A method of providing data from a data source to a data sink, the method comprising:
  a) sending a first request to the data source, wherein the first request does not specify a specific entity of the data source requested by the data sink;
  b) receiving a list of entities of the data source in response to the first request;
  c) sending a second request to the data source, the second request indicative of at least one of the entities;
  d) receiving a first descriptor descriptive of an extractor structure of the at least one entity in response to the second request;
  e) sending a data request to the data source, the data request indicative of the at least one entity and comprising a second descriptor descriptive of a sub-structure of the extractor structure of the at least one entity;
  f) receiving the data from the data source; and
  g) presenting the data received by the data source.

17. The method of claim 16, wherein the data is received in the form of a sequential list.

18. The method of claim 16, further comprising visualizing the extractor structure on a user interface for a user selection of the sub-structure.

19. A computer program for providing data from a data source to a data sink, when executed by a processor the computer program cause the processor to execute a method, the method comprising:
  a) sending a first request to the data source, wherein the first request does not specify a specific entity of the data source requested by the data sink;
  b) receiving a list of entities of the data source in response to the first request;
  c) sending a second request to the data source, the second request indicative of at least one of the entities;
  d) receiving a first descriptor descriptive of an extractor structure of the at least one entity in response to the second request;
  e) sending a data request to the data source, the data request indicative of the at least one entity and comprising a second descriptor descriptive of a sub-structure of the extractor structure of the at least one entity;
  f) receiving the data from the data source; and
  g) presenting the data received by the data source.

20. The computer program of claim 19, the computer instructions being adapted to provide a user interface for the visualization of the extractor structure and a user selection of the sub-structure.

21. A computer system including a processor and a computer program which when executed by the procssor cause the processor to execute a method for providing data from a data source to a data sink, the system further comprising:
  the data sink;
  a data sink application program for sending a first request to a data source, wherein the first request does not specify a specific entity of the data source requested by the data sink,
  receiving a list of entities of the data source in response to the first request
  sending a second request to the data source, the second request indicative of at least one of the entities,
  receiving a first descriptor descriptive of an extractor structure of the at least one entity in response to the second request,
  sending a data request to the data source, the data request indicative of the at least one entity and comprising a second descriptor descriptive of a sub-structure of the extractor structure of the at least one entity,
  receiving the data from the data source, and presenting the data received from the data source to a user.

22. The computer system of claim 21, further comprising a user interface for visualizing the extractor structure and for enabling a user selection of the sub-structure.

* * * * *